(12) United States Patent
Meng

(10) Patent No.: US 9,006,598 B2
(45) Date of Patent: Apr. 14, 2015

(54) CONDUCTIVE STRUCTURE AND METHOD OF MANUFACTURING THE SAME

(75) Inventor: Kai Meng, Shenzhen (CN)

(73) Assignee: Innolux Corporation, Miao-Li County (TW)

( * ) Notice: Subject to any disclaimer, the term of this patent is extended or adjusted under 35 U.S.C. 154(b) by 1022 days.

(21) Appl. No.: 13/095,726

(22) Filed: Apr. 27, 2011

(65) Prior Publication Data

US 2011/0279405 A1 Nov. 17, 2011

(30) Foreign Application Priority Data

May 12, 2010 (CN) .......................... 2010 1 0171440

(51) Int. Cl.
*H03K 17/975* (2006.01)
*G06F 3/044* (2006.01)

(52) U.S. Cl.
CPC ...... *G06F 3/044* (2013.01); *G06F 2203/04103* (2013.01)

(58) Field of Classification Search
USPC ..... 200/600, 46, 5 R, 5 A, 292, 243; 345/173
See application file for complete search history.

(56) References Cited

U.S. PATENT DOCUMENTS

| 2002/0101399 A1* | 8/2002 | Kubo et al. ................... 345/104 |
| 2003/0058225 A1* | 3/2003 | Kusuda et al. ................ 345/173 |
| 2005/0052425 A1* | 3/2005 | Zadesky et al. .............. 345/173 |
| 2009/0160817 A1 | 6/2009 | Wu et al. |

* cited by examiner

*Primary Examiner* — Edwin A. Leon
*Assistant Examiner* — Anthony R. Jimenez
(74) *Attorney, Agent, or Firm* — Li & Cai Intellectual Property (USA) Office

(57) ABSTRACT

The disclosure relates to a touch panel, a method for manufacturing the same, and a touch display device using the same. The touch panel includes a substrate, a lower conductive layer disposed on the substrate, an insulating layer disposed on the lower conductive layer, at least one first conductive wire disposed on the insulating layer, a light shielding layer disposed on the first conductive wire, and an upper conductive layer disposed on the light shielding layer. The light shielding layer and the at least one first conductive wire are located in an edge region of the touch panel in a planar view. The light shielding layer includes at least one first through hole. The upper conductive layer is electrically connected to the at least one first conductive wire via the at least one first through hole.

15 Claims, 12 Drawing Sheets

CONDUCTIVE STRUCTURE AND METHOD OF MANUFACTURING THE SAME

BACKGROUND OF THE DISCLOSURE

1. Field of the Disclosure

The disclosure relates in general to a touch panel, a method for manufacturing the touch panel, and a touch display device using the touch panel.

2. Description of Related Art

With the flourishing development of the flat panel display technology and the gradual decrease of the manufacturing cost, the flat panel display device advantageously having the low radiation, the thin thickness and the low power consumption gradually gets the favor of the consumer, and is thus widely applied to the electronic products. In order to satisfy the more convenient and directer requirement of the man-machine interface for the modern human beings, various flat panel display devices (i.e., touch display devices) having touch functions have been gradually available in the recent market. Usually, the touch display devices may be classified in to an external type and an internal type. The external type touch display device is to add one touch panel to the conventional flat panel display device, wherein the touch panel may be one of resistive, capacitive, infrared or surface acoustic wave touch panels.

Among the various types of touch panels, the capacitive touch panel has gotten the favor of the user and been widely applied to the touch display devices because it advantageously has the stable performance and the high lifetime and supports the multi-point touch.

The existing capacitive touch panel usually includes a substrate, a lower conductive layer, an insulating layer and an upper conductive layer, which are sequentially disposed on substrate, and light-shielding ink covering a boundary edge of the upper conductive layer. Moreover, in order to protect the upper conductive layer from being worn and damaged when being touched, a transparent cover layer (coverlens) is further disposed above the upper conductive layer of the capacitive touch panel, wherein the transparent cover layer is adhered to the light-shielding ink via an optical adhesive.

In the processes of manufacturing the touch panel, however, the step of adhering the transparent cover layer via the optical adhesive makes the manufacturing processes become complicated, and further damages the upper conductive layer to reduce the reliability. In addition, the use of the optical adhesive somewhat increases the manufacturing cost.

SUMMARY OF THE DISCLOSURE

The disclosure is directed to a touch panel with the simpler manufacturing processes, the higher reliability and the lower cost.

Meanwhile, the disclosure is also directed to a method for manufacturing the touch panel and a touch display device using the touch panel.

According to a first aspect of the present disclosure, a touch panel is provided. The touch panel includes a substrate, a lower conductive layer disposed on the substrate, an insulating layer disposed on the lower conductive layer, at least one first conductive wire disposed on the insulating layer, a light shielding layer disposed on the first conductive wire, and an upper conductive layer disposed on the light shielding layer. The light shielding layer and the at least one first conductive wire are located in an edge region of the touch panel in a planar view. The light shielding layer includes at least one first through hole. The upper conductive layer is electrically connected to the at least one first conductive wire via the at least one first through hole.

According to a second aspect of the present disclosure, a method for manufacturing a touch panel is provided. The method includes the steps of: providing a transparent substrate serving as a transparent cover layer of the touch panel; forming an upper conductive layer directly on the transparent cover layer; forming a light shielding layer on one side of the upper conductive layer away from the transparent cover layer and forming at least one first through hole in the light shielding layer; forming at least one first conductive wire on one side of the light shielding layer away from the upper conductive layer, wherein the at least one first conductive wire is electrically connected to the upper conductive layer via the at least one first through hole; forming an insulating layer on one side of the at least one first conductive wire away from the light shielding layer; and forming a lower conductive layer on one side of the insulating layer away from the at least one first conductive wire.

According to a third aspect of the present disclosure, a touch display device is provided. The touch display device includes a touch panel and a display panel overlapping with the touch panel. The touch panel includes a substrate and a lower conductive layer, an insulating layer, at least one first conductive wire, a light shielding layer and an upper conductive layer, which are successively disposed in a surface direction away from the substrate. The light shielding layer defines the touch panel into a transparent display region and an edge region where the light shielding layer is located. The at least one first conductive wire is located in the edge region. The light shielding layer includes at least one first through hole. The at least one first conductive wire has one end electrically coupled to an external circuit, and the other end electrically coupled to the upper conductive layer via the at least one first through hole.

The above and other aspects of the disclosure will become better understood with regard to the following detailed description of the preferred but non-limiting embodiment(s). The following description is made with reference to the accompanying drawings.

DESCRIPTION OF EMBODIMENTS

Figure 1:
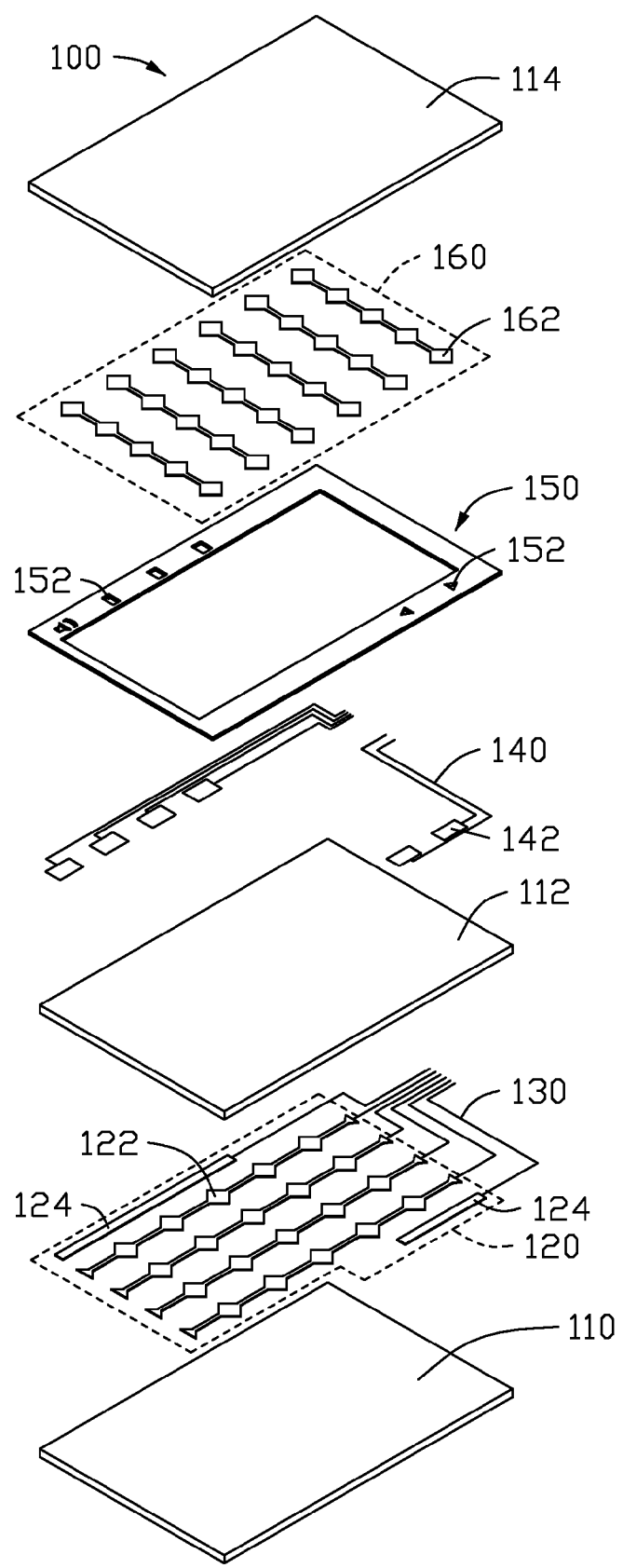
FIG. 1 is a pictorially decomposed illustration showing a touch panel according to a preferred embodiment of the disclosure.

A touch panel according to a first embodiment of the disclosure includes a substrate, a lower conductive layer disposed on the substrate, an insulating layer disposed on the lower conductive layer, a first conductive wire disposed on the insulating layer, a light shielding layer disposed on the first conductive wire, and an upper conductive layer disposed on the light shielding layer. The light shielding layer and the first conductive wire are located in an edge region of the touch panel in a planar view. The light shielding layer includes a first through hole. The upper conductive layer is electrically connected to the first conductive wire via the first through hole.

In the touch panel of the first embodiment, the upper conductive layer may be directly formed on a transparent cover layer so as to simplify the manufacturing processes and reduce the manufacturing cost.

A touch panel according to a second embodiment of the disclosure includes a lower conductive layer, an insulating layer disposed on the lower conductive layer, an upper conductive layer disposed on the insulating layer and a transparent cover layer covering the upper conductive layer. A first conductive wire is further disposed on the insulating layer, and a light shielding layer is disposed on the first conductive wire. The light shielding layer includes a first through hole. The first conductive wire is electrically connected to the upper conductive layer via the first through hole. The light shielding layer and the first conductive wire are located in an edge region of the touch panel in a planar view. The upper and lower conductive layers overlap with each other in the edge region to form a first touch capacitor. The first through hole serves as a touch function control character of the first touch capacitor. When a position where the first through hole is located is touched, a capacitance of the first touch capacitor is changed and detected.

In the second embodiment, the light shielding layer is located between the upper and lower conductive layers, so that the upper conductive layer may be directly formed on the transparent cover layer. Compared with the prior art, the touch panel of the second embodiment can simplify the manufacturing processes and reduce the manufacturing cost.

Moreover, in one embodiment, the light shielding layer includes a first through hole, and the upper conductive layer includes a plurality of first conductive traces extending in a first direction. The first conductive wire is electrically connected to one of the first conductive traces via the first through hole.

Furthermore, in one embodiment, the lower conductive layer includes a plurality of second conductive traces insulatively intersecting the first conductive traces and extending in a second direction perpendicular to the first direction.

Moreover, the lower conductive layer further includes an additional conductive trace extending in the second direction. The additional conductive trace partially overlaps with one of the first conductive traces or the first conductive wire to form the first touch capacitor.

Furthermore, in one embodiment, the first through hole further corresponds to the first touch capacitor so that the first through hole servers as the touch function control character.

Moreover, in one embodiment, the touch function control character may be a volume control character, a music-video-play control character, a screen-slide control character or the like.

Furthermore, in one embodiment, the touch panel further includes a second conductive wire located in the edge region. The second conductive wire is to be electrically connected to one of the second conductive traces of the lower conductive layer.

Moreover, in one embodiment, the upper conductive layer further includes an additional conductive trace extending in the first direction. The additional conductive trace of the upper conductive layer partially insulatively overlaps with one of the second conductive traces or the second conductive wire to form a second touch capacitor.

Furthermore, in one embodiment, the light shielding layer further includes a second through hole corresponding to the second touch capacitor and serving as a touch function control character of the second touch capacitor. When the position where the second through hole is located is touched, a capacitance of the second touch capacitor is changed and detected.

Moreover, in one embodiment, the edge region further includes a joint region. One end of the first conductive wire and one end of the second conductive wire are arranged in the joint region and to be electrically connected to an external circuit.

Furthermore, in one embodiment, a material of the transparent cover layer is glass or an acrylic material.

Moreover, in one embodiment, a material of the light shielding layer includes ink.

Furthermore, in one embodiment, an overlapped region between the additional conductive trace and one of the second conductive traces of the upper conductive layer is a trapezoidal region.

Alternatively, in one embodiment, the additional conductive trace of the upper conductive layer may include a comb-shaped structure and a communicating portion communicating with the comb-shaped structure. A portion of the second conductive trace extending to the edge region and neighboring the additional conductive trace of the second conductive layer also includes a comb-shaped structure. The comb-shaped structure of the additional conductive trace of the upper conductive layer alternately meshes with the comb-shaped structure of the second conductive trace. The communicating portion of the additional conductive trace of the upper conductive layer partially overlaps with the comb-shaped structure of the second conductive trace to form the at least one second touch capacitor.

Furthermore, in one embodiment, the overall shape constituted by the comb-shaped structure of the additional conductive trace of the upper conductive layer and the comb-shaped structure of the second conductive trace may be substantially rectangular, circular or trapezoidal.

Alternatively, in one embodiment, the additional conductive trace of the upper conductive layer includes a hollow annular structure and a communicating portion communicating with the annular structure. A portion of the second conductive trace extending to the edge region and neighboring the additional conductive trace of the upper conductive layer includes a circular portion and a communicating portion. The circular portion is located at a middle of the annular structure, and the communicating portion of the second conductive trace overlaps with the annular structure to form at least one second touch capacitor.

The disclosure further provides a method for manufacturing a touch panel. The method includes the steps of: providing a transparent substrate serving as a transparent cover layer of the touch panel; forming an upper conductive layer directly on the transparent cover layer; forming a light shielding layer on one side of the upper conductive layer away from the transparent cover layer and forming at least one first through hole in the light shielding layer; forming at least one first conductive wire on one side of the light shielding layer away from the upper conductive layer, wherein the at least one first conductive wire is electrically connected to the upper conductive layer via the at least one first through hole; forming an insulating layer on one side of the at least one first conductive wire away from the light shielding layer; and forming a lower conductive layer on one side of the insulating layer away from the at least one first conductive wire.

In the method for manufacturing the touch panel, the upper conductive layer is directly formed on the transparent cover layer so that the manufacturing processes are simplified and the manufacturing cost is reduced.

The disclosure provides a touch display device including a touch panel and a display panel overlapping with the touch panel. The touch panel includes a substrate, and a lower conductive layer, an insulating layer, a first conductive wire, a light shielding layer and an upper conductive layer, which are successively disposed in a surface direction away from the substrate. The light shielding layer defines the touch panel into a transparent display region and an edge region in which the light shielding layer is located. The first conductive wire is located in the edge region. The light shielding layer includes a first through hole. The first conductive wire has one end electrically coupled to an external circuit, and the other end electrically coupled to the upper conductive layer via the first through hole.

In the touch display device, the upper conductive layer may be directly formed on a transparent cover layer so that the manufacturing processes are simplified and the manufacturing cost is reduced.

Furthermore, in one embodiment, the light shielding layer may be a hollow frame.

Moreover, in one embodiment, the touch panel further includes a transparent cover layer located on the upper conductive layer so that the upper conductive layer is directly formed on the transparent cover layer.

Furthermore, in one embodiment, the upper conductive layer includes a plurality of first conductive traces extending in a first direction. The first conductive wire is electrically connected to one of the first conductive traces via the first through hole.

Moreover, in one embodiment, the lower conductive layer includes a plurality of second conductive traces insulatively intersecting the first conductive traces and extending in a second direction perpendicular to the first direction.

Furthermore, the lower conductive layer further includes an additional conductive trace extending in the second direction. The additional conductive trace is located in the edge region. The additional conductive trace partially overlaps with one of the first conductive traces or the first conductive wire to form a first touch capacitor.

Moreover, in one embodiment, the first through hole further corresponds to the first touch capacitor, and the first through hole serves as a touch function control character of the first touch capacitor.

Furthermore, in one embodiment, the touch function control character may be a volume control character, a music-video-play control character, a screen-slide control character or the like.

Moreover, in one embodiment, the touch panel further includes a second conductive wire located in the edge region and to be electrically connected to one of the second conductive traces of the lower conductive layer.

Furthermore, in one embodiment, the upper conductive layer further includes an additional conductive trace extending in the first direction. The additional conductive trace of the upper conductive layer partially insulatively overlaps with one of the second conductive traces or the at least one second conductive wire to form a second touch capacitor.

Moreover, in one embodiment, the light shielding layer further includes a second through hole corresponding to the second touch capacitor and serving as a touch function control character of the second touch capacitor. When the position where the second through hole is located is touched, a capacitance of the second touch capacitor is changed and detected.

Furthermore, in one embodiment, the edge region further includes a joint region. The one end of the first conductive wire and the one end of the second conductive wire are arranged in the joint region and to be electrically connected to an external circuit.

Moreover, in one embodiment, a material of the transparent cover layer is glass or an acrylic material.

Furthermore, in one embodiment, a material of the light shielding layer includes ink.

Moreover, in one embodiment, an overlapped region between the additional conductive trace of the upper conductive layer and one of the plurality of second conductive trace is trapezoidal.

Alternatively, in one embodiment, the additional conductive trace of the upper conductive layer may include a comb-shaped structure and a communicating portion communicating with the comb-shaped structure. A portion of the second conductive trace extending to the edge region and neighboring the additional conductive trace of the upper conductive layer also includes a comb-shaped structure. The comb-shaped structure of the additional conductive trace of the upper conductive layer alternately meshes with the comb-shaped structure of the second conductive trace. The communicating portion of the additional conductive trace of the upper conductive layer partially overlaps with the comb-shaped structure of the second conductive trace to form the at least one second touch capacitor.

Furthermore, in one embodiment, the overall shape constituted by the comb-shaped structure of the additional conductive trace of the upper conductive layer and the comb-shaped structure of the second conductive trace may be substantially rectangular, circular or trapezoidal.

Alternatively, in one embodiment, the additional conductive trace of the upper conductive layer includes a hollow annular structure and a communicating portion communicating with the annular structure. A portion of the second conductive trace extending to the edge region and neighboring the additional conductive trace of the upper conductive layer includes a circular portion and a communicating portion. The circular portion is located at a middle of the annular structure, and the communicating portion of the second conductive trace overlaps with the annular structure to form at Page of least one second touch capacitor.

The touch panel and the touch display device according to the preferred embodiments of the disclosure will be described in the following.

FIG. 1 is a pictorially decomposed illustration showing a touch panel 100 according to a preferred embodiment of the disclosure. Referring to FIG. 1, the touch panel 100 includes a substrate 110, a lower conductive layer 120, an upper conductive layer 160, an insulating layer 112, a light shielding layer 150, a transparent cover layer 114, a plurality of first conductive wires 140 and a plurality of second conductive wires 130. The lower conductive layer 120 is disposed on the substrate 110. The second conductive wires 130 electrically connected to the lower conductive layer 120 may also be disposed on the substrate 110. The insulating layer 112 is disposed above the lower conductive layer 120. In one embodiment, the insulating layer 112 may cover the lower conductive layer 120 and the first conductive wires 140. The first conductive wires 140 are disposed on the insulating layer 112. The light shielding layer 150 disposed on the first conductive wires 140 includes a plurality of first through holes 152. The upper conductive layer 160 located on the light shielding layer 150 is electrically connected to the first conductive wires 140 via the first through holes 152 of the light shielding layer 150.

Figure 2:
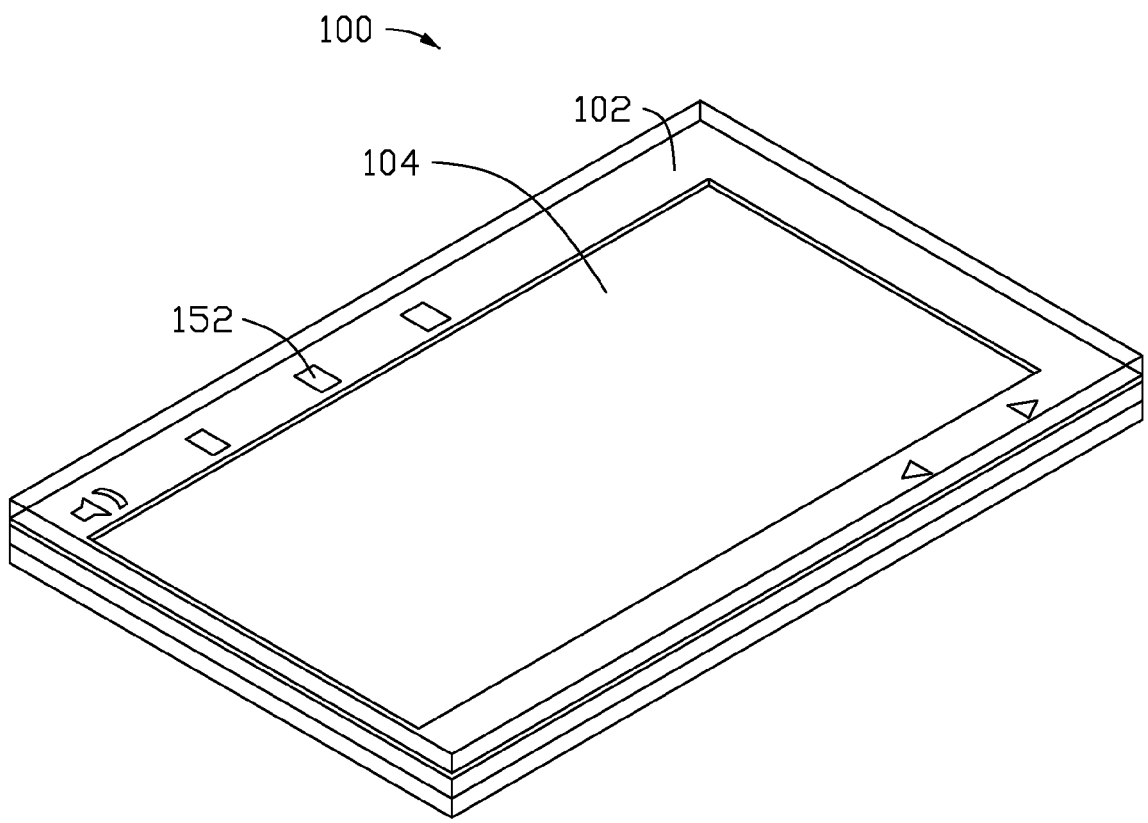
FIG. 2 is a pictorial structure view showing the touch panel of FIG. 1 after various elements are combined together.
Figure 3:
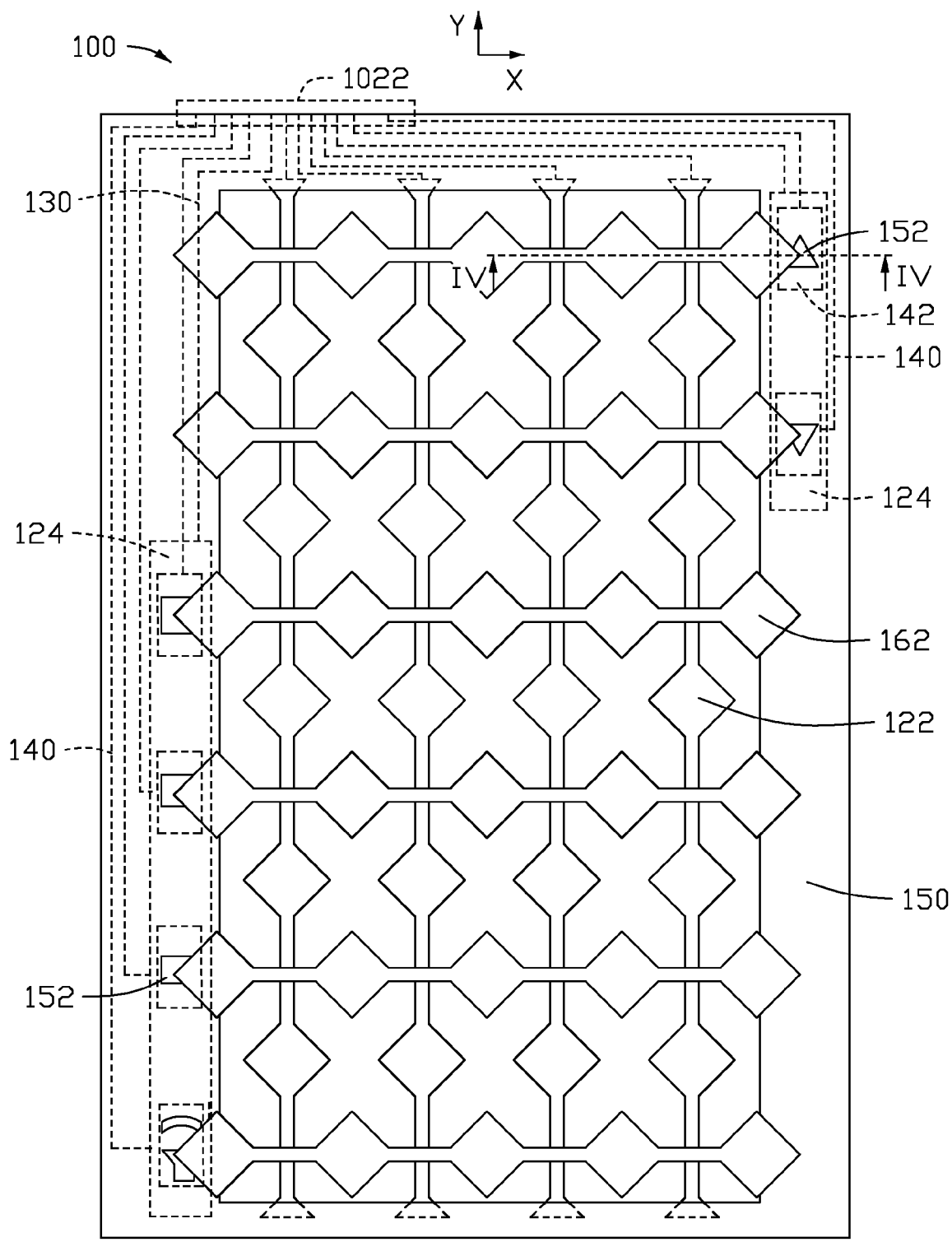
FIG. 3 is a planar perspective view showing the touch panel of FIG. 1.
Figure 4:
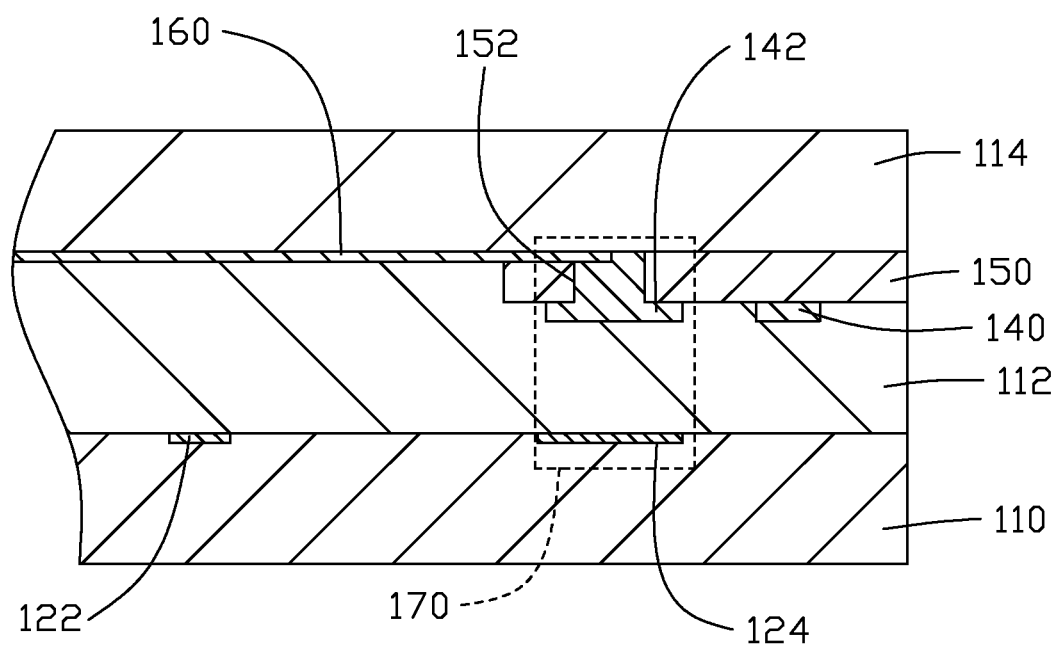
FIG. 4 is a schematically cross-sectional view taken along a line IV-IV of FIG. 3.

FIG. 2 is a pictorial structure view showing the touch panel 100 of FIG. 1 after various elements are combined together. FIG. 3 is a planar perspective view showing the touch panel 100 of FIG. 1. FIG. 4 is a schematically cross-sectional view taken along a line IV-IV of FIG. 3. As shown in FIGS. 2 to 4, the light shielding layer 150 is a hollow rectangular frame, and is located in an edge region 102 of a boundary of the touch panel 100 in a planar view. The hollow rectangular frame of the light shielding layer 150 defines a transparent touch display region 104 surrounded by the edge region 102. The first conductive wires 140 and the second conductive wires 130 are insulated from each other, and are located under the light shielding layer 150 (i.e., located in the edge region 102 of the touch panel 100) in a planar view. Preferably, the first conductive wires 140 and the second conductive wires 130 are interlaced.

The upper conductive layer 160 includes a plurality of first conductive traces 162 extending a first direction X. The lower conductive layer 120 includes a plurality of second conductive traces 122 extending in a second direction Y and insulatively intersecting the first conductive traces 162. The second direction Y is perpendicular to the first direction X. The first conductive traces 162 penetrate through the touch display region 104, and the first conductive traces 162 overlaps with the light shielding layer 150 in the edge region 102. The second conductive traces 122 also penetrate through the touch display region 104. The second conductive traces 122 may partially overlap with the light shielding layer 150 in the edge region 102.

The first conductive wires 140 respectively correspond to the first conductive traces 162 in a one-to-one manner. Each first conductive wire 140 is electrically connected to a corresponding first conductive trace 162 via a corresponding first through hole 152. One end of each first conductive wire 140 electrically connected to the first conductive trace 162 defines an electrode 142, which may have a specific shape, such as a rectangular or circular shape.

The lower conductive layer 120 further includes additional conductive traces 124. In this embodiment, there are two additional conductive traces 124. In other embodiments, the number of the additional conductive trace 124 may be selected according to the actual condition. The two additional conductive traces 124 may extend in the second direction Y, and respectively located on two sides (e.g., the lower left side and the upper right side) of the second conductive traces 122. The two additional conductive traces 124 at least partially overlap with the light shielding layer 150. Preferably, the two additional conductive traces 124 are located in the edge region 102 (i.e., under the light shielding layer 150) in this embodiment. Each additional conductive trace 124 is also electrically connected to one second conductive wire 130.

In a planar view, the two additional conductive traces 124 overlap with the first conductive traces 162 and the first conductive wires 140 to form a plurality of first touch capacitors 170. Meanwhile, the positions of two additional conductive traces 124 correspond to those of the first through holes 152, and the first through holes 152 respectively correspond to the first touch capacitors 170 so that the first through holes 152 may respectively serve as touch function control characters of the first touch capacitors 170. When the position of the transparent cover layer 114, where a certain first through hole 152 is located, is touched or operated, the capacitance of the first touch capacitor 170 corresponding to the first through hole 152 is changed, and the external circuit connected to the first and second conductive wires 140 and 130 can detect the change of the capacitance of the first touch capacitor 170 so that the external circuit can perform the corresponding operation. The touch function control character may be a volume control character, a screen-slide control character or the like, as shown in FIGS. 1 to 3.

Referring again to FIG. 4, the upper conductive layer 160 is in direct contact with the transparent cover layer 114, and the upper conductive layer 160 is formed on the transparent cover layer 114. For example, a transparent conductive material may be deposited on the transparent cover layer 114, directly serving as a support substrate, to form the upper conductive layer 160.

The edge region 102 further includes a joint region 1022. One end of the first conductive wire 140 and one end of the second conductive wire 130 are arranged in the joint region 1022 and are to be electrically connected to the external circuit (e.g., flexible circuit board).

Moreover, the material of the transparent cover layer 114 may be glass or an acrylic material. The material of the light shielding layer 150 may be ink. The upper conductive layer 160 and the lower conductive layer 120 are transparent conductive layers made of indium zinc oxide. The material of the first conductive wire 140 and the second conductive wire 130 may be metal or a transparent conductive material. Preferably, the materials of the first conductive wire 140 and the second conductive wire 130 are silver.

Compared with the prior art, the light shielding layer 150 is not disposed between the upper conductive layer 160 and the transparent cover layer 114 in the touch panel 100 of the disclosure. Thus, the upper conductive layer 160 may be directly formed on the transparent cover layer 114 to simplify the manufacturing processes. Meanwhile, no optical adhesive has to be used in the manufacturing processes, the adhesive connection thereof can enhance the reliability, the manufacturing cost can be reduced and the thickness of the touch panel 100 can be reduced.

In addition, the touch panel 100 of the disclosure has the additional conductive trace 124 overlapping with the first conductive traces 162 and the first conductive wires 140 to form the first touch capacitors 170. Meanwhile, the first through holes 152 of the light shielding layer 150 function to electrically connect the first conductive wires 140 to the first conductive traces 162, and also serve as the touch function control characters of the first touch capacitors 170, so that the touch panel 100 edge region 102 has the added touch function, and the operable ability of the touch panel 100 is enhanced.

Figure 5:
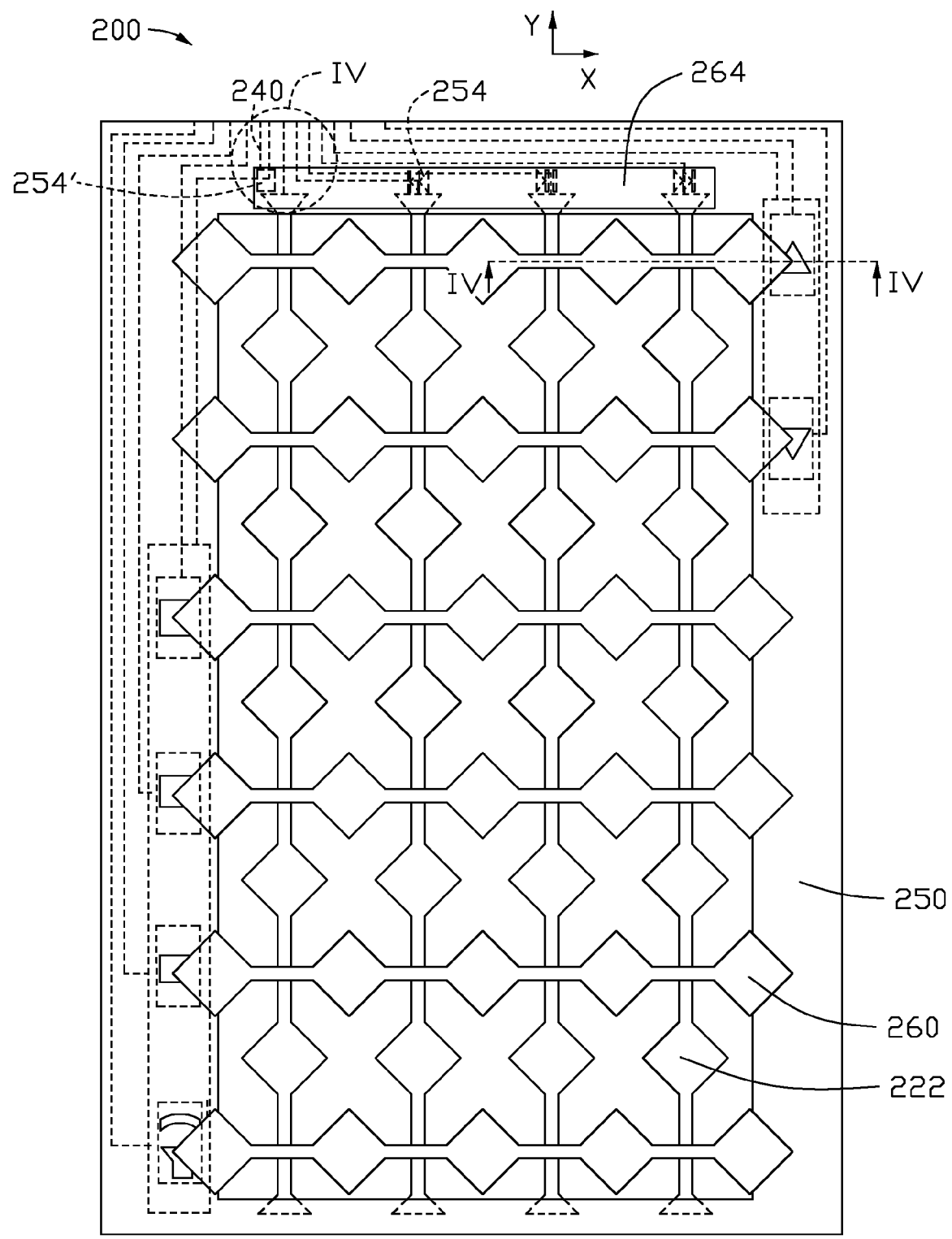
FIG. 5 is a planar perspective view showing a touch panel according to another preferred embodiment of the disclosure.
Figure 6:
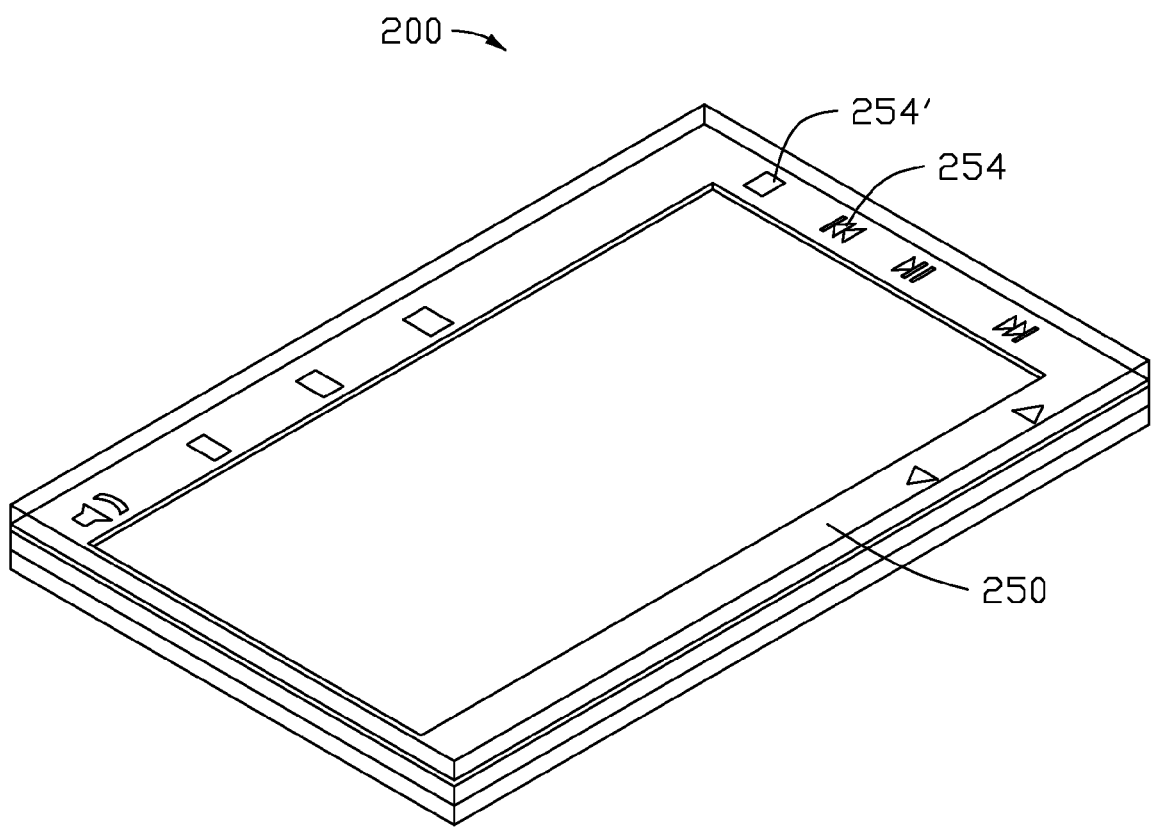
FIG. 6 is a pictorial structure view showing the touch panel of FIG. 5.

FIG. 5 is a planar perspective view showing a touch panel 200 according to another preferred embodiment of the disclosure. FIG. 6 is a pictorial structure view showing the touch panel 200 of FIG. 5. As shown in FIGS. 5 and 6, the difference between the touch panel 200 and the touch panel 100 mainly resides in that the upper conductive layer 260 further includes an additional conductive trace 264 extending in the first direction X. The additional conductive trace 264 of the upper conductive layer 260 insulatively overlaps with the second conductive traces 222 or the second conductive wires 230 to form a plurality of second touch capacitors (not labeled). The light shielding layer 250 further includes a plurality of second through holes 254 respectively corresponding to the second touch capacitors and serving as the touch function control characters of the second touch capacitors. The touch function control character may be a music-video-play control character. In addition, the additional conductive trace 264 of the upper conductive layer 260 is also electrically connected to a first conductive wire 240 via a second through hole 254'. In this embodiment, only one second through hole 254' is electrically connected to the first conductive wire 240 and the additional conductive trace 264 of the upper conductive layer 260, and the other second through holes 254 do not have the electrical connection function and mainly function as the touch function control characters.

Compared with the touch panel 100 of the first embodiment, the upper conductive layer 260 of the touch panel 200 of the second embodiment further includes the additional conductive trace 264 extending in the first direction. The additional conductive trace 264 of the upper conductive layer 260 insulatively overlaps with the second conductive traces 222 or the second conductive wires 230 to form a plurality of second touch capacitors, the second through holes 254 of the light shielding layer 250 are provided to serve as the touch function control characters of the second touch capacitors. Thus, the touch function in the edge region of the touch panel 200 is added, and the operable ability of the touch panel 200 is enhanced.

Figure 7:
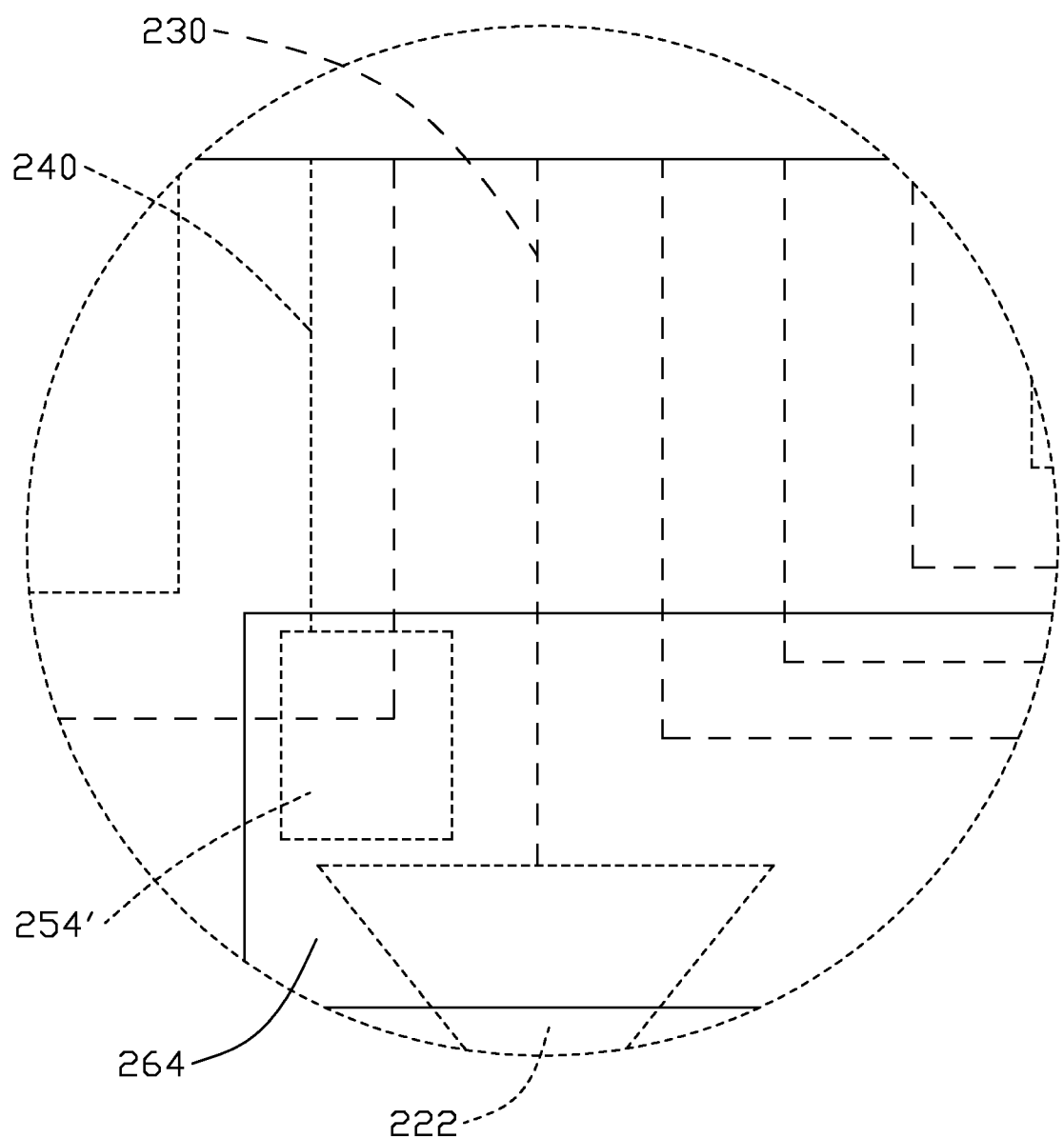
FIG. 7 is a schematically partially enlarged view showing the touch panel of FIG. 5.

FIG. 7 is a schematically partially enlarged view showing the touch panel of FIG. 5. As shown in FIG. 7, the overlapped region between the additional conductive trace 264 of the upper conductive layer 260 and the second conductive trace 222 has the trapezoidal shape. Of course, the overlapped region may also have other shapes. Furthermore, in order to enhance the property of the touch capacitor formed by the overlapping between the additional conductive trace 264 and the second conductive trace 222, the disclosure also provides a new design to the partial shapes of the second conductive trace 222 and the additional conductive trace 264 in order to adjust the area of the overlapped region.

Figure 8:
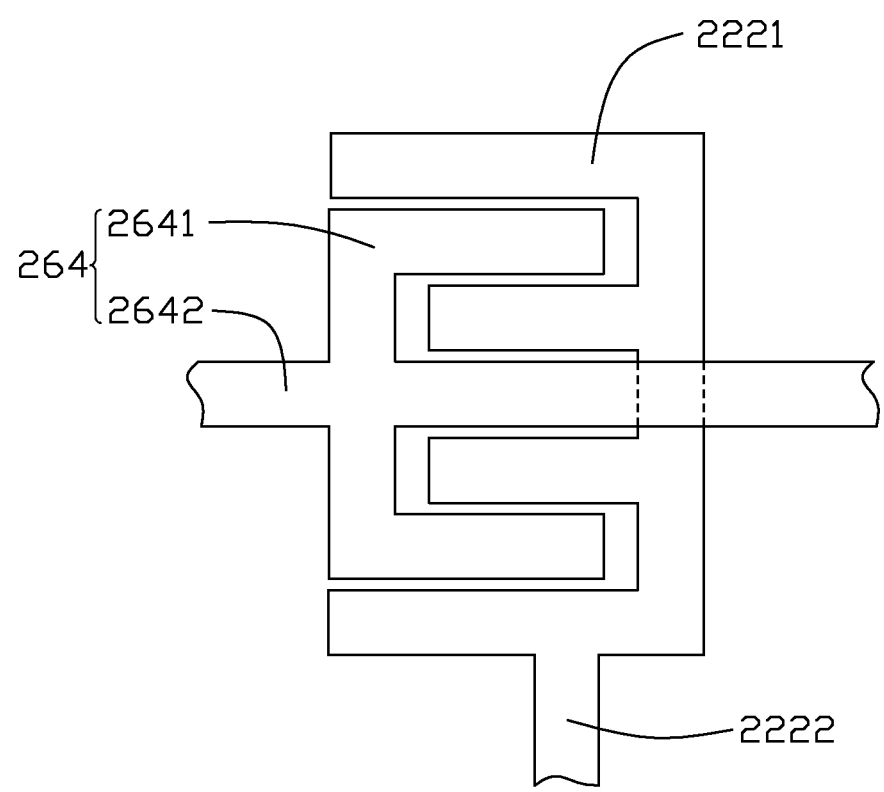
FIGS. 8 to 11 are schematic illustrations showing various modified embodiments of FIG. 7.
Figure 9:
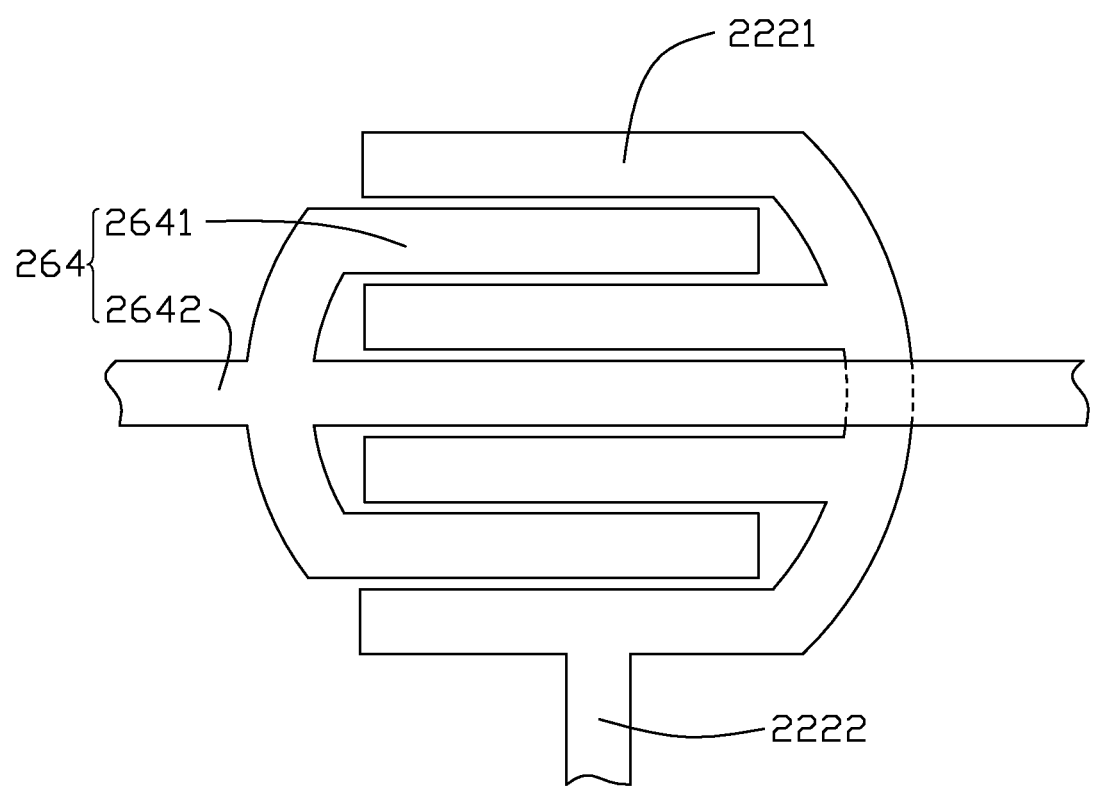
Figure 10:
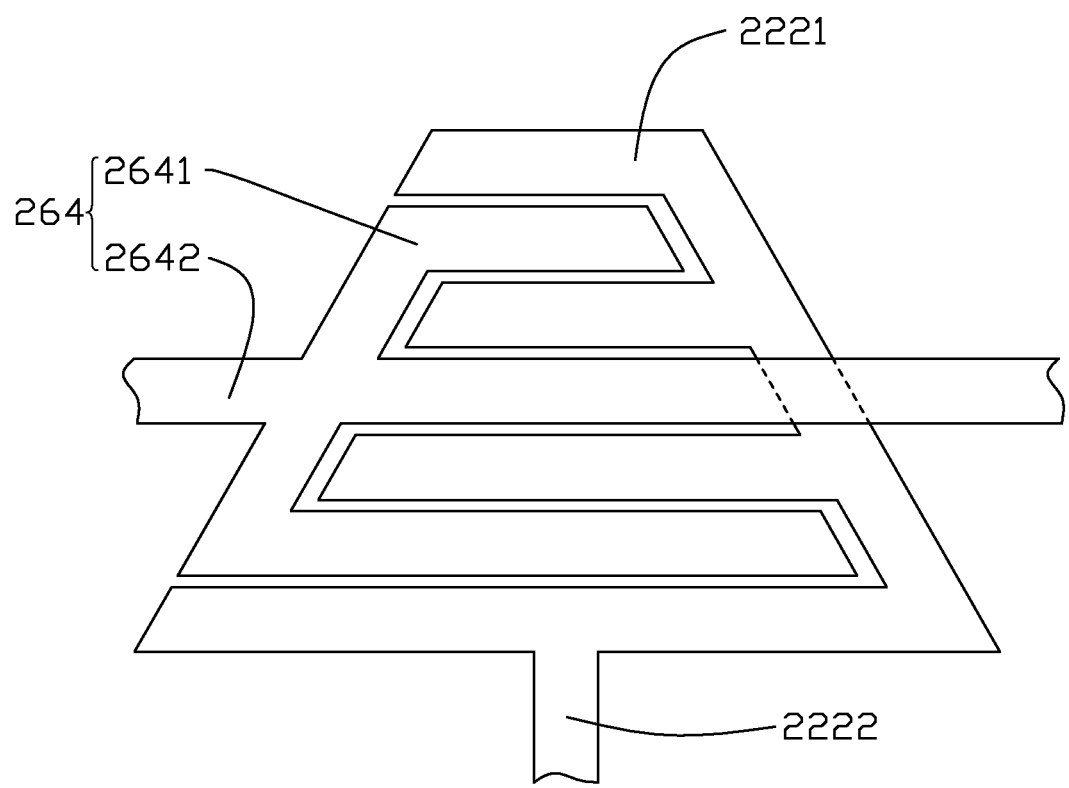

FIGS. 8 to 11 are schematic illustrations showing various modified embodiments of FIG. 7. In FIGS. 8, 9 and 10, the additional conductive trace 264 of the upper conductive layer 260 may include a comb-shaped structure 2641 and a communicating portion 2642 communicating with the comb-shaped structure 2641. A portion of the second conductive trace 222 extending to the edge region and neighboring the additional conductive trace 264 of the upper conductive layer 260 also includes a comb-shaped structure 2221. The comb-shaped structure 2641 of the additional conductive trace 264 of the upper conductive layer 260 alternately meshes with the comb-shaped structure 2221 of the second conductive trace 222. The communicating portion 2642 of the additional conductive trace 264 of the upper conductive layer 260 partially overlaps with the comb-shaped structure 2221 of the second conductive trace 222 to form a second touch capacitor. The difference between FIGS. 8, 9 and 10 mainly resides in that the overall shape constituted by the comb-shaped structure 2641 is different from that constituted by the comb-shaped structure 2221. The overall shapes are respectively, a rectangular shape, a substantially circular shape and a trapezoidal shape.

Figure 11:
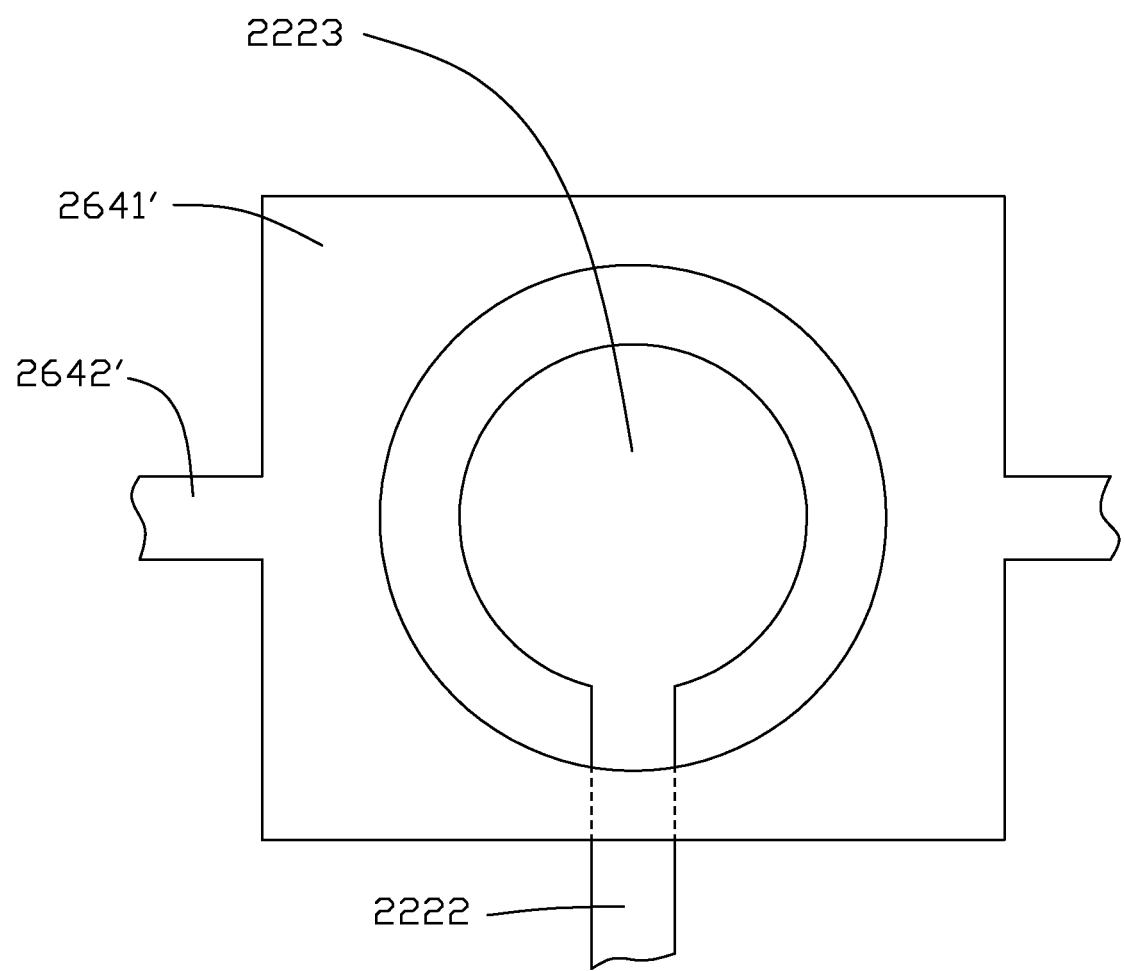

In FIG. 11, the additional conductive trace 264 of the upper conductive layer 260 includes a hollow annular structure 2641' and a communicating portion 2642' communicating with the annular structure. The portion of the second conductive trace 222, extending to the edge region and neighboring the additional conductive trace 264 of the upper conductive layer 260, includes a circular portion 2223 and a communicating portion 2220. The circular portion 2223 is located at the middle of the annular structure 2641', and the communicating portion 2222 of the second conductive trace 222 overlaps with the annular structure 2641' to form the second touch capacitor.

The designs of FIGS. 8 to 11 can enlarge the area to be touched without enlarging the overlapped region between the additional conductive trace 264 and the second conductive trace 222, and can be specifically designed to meet the size of the pad of the human's finger to enhance the operation convenience of the touch panel.

Moreover, as shown in FIGS. 1 and 4, the disclosure further provides a method for manufacturing the touch panel 100. The method includes the following steps.

In step S1, a transparent substrate serving as the transparent cover layer 114 of the touch panel 100 is provided.

Specifically speaking, the transparent substrate serves as a support base as well as a touch surface of the touch panel 100 (i.e., the transparent cover layer 114).

In step S2, an upper conductive layer 160 is formed directly on the transparent cover layer 114.

Specifically speaking, a first transparent conductive layer is deposited on a surface of the transparent cover layer 114; and a predetermined pattern is provided, and the first transparent conductive layer is etched according to the predetermined pattern so that the upper conductive layer 160 with the pattern of FIG. 1 is formed.

In step S3, the light shielding layer 150 is formed on one side of the upper conductive layer 160 away from the transparent cover layer 114, and a plurality of first through holes 152 is formed in the light shielding layer 150.

Specifically speaking, a layer of light-shading material is deposited on the surface of the upper conductive layer 160 away from the transparent cover layer 114, and the layer of light-shading material is etched to form the light shielding layer 150 with the pattern of FIG. 1 and the first through holes 152 in the light shielding layer 150.

In step S4, the first conductive wires 140 is formed on one side of the light shielding layer 150 away from the upper conductive layer 160, and the first conductive wires 140 are electrically connected to the upper conductive layer 160 via the first through holes 152. The step includes depositing a first metal layer on the surface of the light shielding layer 150 away from the upper conductive layer 160, and etching the first metal layer to from the first conductive wires 140 with the pattern of FIG. 1.

In step S5, the insulating layer 112 is formed on one side of the first conductive wires 140 away from the light shielding layer 150. The step includes depositing an insulation material to cover the first conductive wires 140, the light shielding layer 150, the upper conductive layer 160 and the transparent cover layer 114.

In step S6, the lower conductive layer 120 is formed on one side of the insulating layer 112 away from the first conductive wires 140. Specifically speaking, a second transparent conductive layer is deposited on the surface of the insulating layer 112 away from the first conductive wires 140, and the first transparent conductive layer is etched to form the lower conductive layer 120 with the pattern of FIG. 1.

In step S7, the second conductive wires 130 electrically connected to the lower conductive layer 120 are formed. The step includes depositing a second metal layer, and etching the second metal layer to form the second conductive wires 130 with the pattern of FIG. 1.

In step S8, an insulating layer is provided to cover one side of the lower conductive layer 120 away from the insulating layer 112 to form the substrate 110. The step includes depositing an insulation material to cover the lower conductive layer 120, a plurality of second conductive wires 130 and the insulating layer 112.

Compared with the conventional manufacturing method, the upper conductive layer 160 is directly formed on the transparent cover layer 114 in the method of manufacturing the touch panel 100 of the disclosure. Thus, the manufacturing processes are simplified, and the manufacturing cost is decreased.

Figure 12:
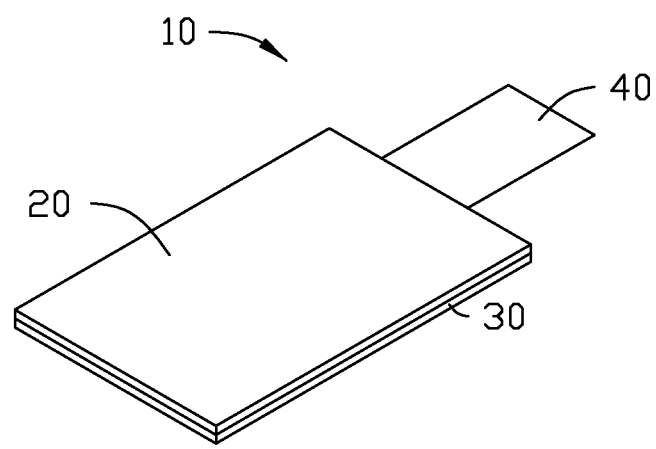
FIG. 12 is a schematic illustration showing a touch display device according to a preferred embodiment of the disclosure.

FIG. 12 is a schematic illustration showing a touch display device 10 according to a preferred embodiment of the disclosure. Referring to FIG. 12, the touch display device 10 includes a touch panel 20, a display panel 30 overlapping with the touch panel 20, and a circuit board 40 electrically connected to the touch panel 20. The touch panel 20 may be selected from the touch panels of the first and second embodiments, and the display panel 30 may be a liquid crystal display panel, an organic light emitting diode (OLED) display panel, a field emission display panel or the like.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch panel, comprising:
   a substrate;
   a lower conductive layer disposed on the substrate;
   an insulating layer disposed on the lower conductive layer;
   at least one first conductive wire disposed on the insulating layer;
   a light shielding layer disposed on the first conductive wire; and
   an upper conductive layer disposed on the light shielding layer and electrically insulated from the lower conductive layer by the insulating layer, wherein the light shielding layer and the at least one first conductive wire are located in an edge region of the touch panel in a planar view, the light shielding layer comprises at least one first through hole, and the upper conductive layer is electrically connected to the at least one first conductive wire via the at least one first through hole.

2. The touch panel according to claim 1, further comprising a transparent cover layer located on the upper conductive layer, wherein the upper conductive layer is formed directly on the transparent cover layer.

3. The touch panel according to claim 1, wherein the upper conductive layer comprises a plurality of first conductive traces extending in a first direction, the at least one first conductive wire is electrically connected to one of the first conductive traces via the at least one first through hole; and the lower conductive layer comprises second conductive traces insulatively intersecting the first conductive traces and extending in a second direction perpendicular to the first direction.

4. The touch panel according to claim 3, wherein the lower conductive layer further comprises at least one additional conductive trace extending in the second direction, the at least one additional conductive trace is located in the edge region, and the at least one additional conductive trace partially overlaps with one of the first conductive traces or at least one first conductive wire to form at least one first touch capacitor.

5. The touch panel according to claim 4, wherein the at least one first through hole corresponds to the at least one first touch capacitor, and the at least one first through hole serves as a touch function control character of the at least one first touch capacitor.

6. The touch panel according to claim 5, wherein the touch function control character is a volume control character, a music-video-play control character or a screen-slide control character.

7. The touch panel according to claim 6, wherein the touch panel further comprises at least one second conductive wire located in the edge region, and the at least one second conductive wire is to be electrically connected to the of second conductive traces of the lower conductive layer.

8. The touch panel according to claim 7, wherein the upper conductive layer further comprises at least one additional conductive trace extending in the first direction, and the at least one additional conductive trace of the upper conductive layer partially insulatively overlaps with one of the second conductive traces or the at least one second conductive wire to form at least one second touch capacitor.

9. The touch panel according to claim 8, wherein the light shielding layer further comprises at least one second through hole, which corresponds to the at least one second touch capacitor and serves as a touch function control character of the at least one second touch capacitor.

10. The touch panel according to claim 7, wherein the edge region comprises a joint region, one end of the at least one first conductive wire and one end of at least one second conductive wire are arranged in the joint region and are to be electrically connected to an external circuit.

11. The touch panel according to claim 10, wherein there are a plurality of the first conductive wires, there are a plurality of the first through holes, and the first conductive traces are electrically connected to the first conductive wires via the first through holes.

12. The touch panel according to claim 11, wherein there are a plurality of the second conductive wires, and the second conductive wires are electrically connected to the second conductive traces.

13. The touch panel according to claim 2, wherein a material of the transparent cover layer is glass or an acrylic material.

14. A method for manufacturing a touch panel, the method comprising the steps of:
   providing a transparent substrate serving as a transparent cover layer of the touch panel;
   forming an upper conductive layer directly on the transparent cover layer;
   forming a light shielding layer on one side of the upper conductive layer away from the transparent cover layer and forming at least one first through hole in the light shielding layer;
   forming at least one first conductive wire on one side of the light shielding layer away from the upper conductive layer, wherein the at least one first conductive wire is electrically connected to the upper conductive layer via the at least one first through hole;
   forming an insulating layer on one side of the at least one first conductive wire away from the light shielding layer; and
   forming a lower conductive layer on one side of the insulating layer away from the at least one first conductive wire, wherein the lower conductive layer is electrically insulated from the upper conductive layer by the insulating layer.

15. A touch display device, comprising a touch panel and a display panel overlapping with the touch panel, wherein the touch panel comprises a substrate and a lower conductive layer, an insulating layer, at least one first conductive wire, a light shielding layer and an upper conductive layer, which are successively disposed in a surface direction away from the substrate, wherein the upper conductive layer is electrically insulated from the lower conductive layer, the light shielding layer defines the touch panel into a transparent display region and an edge region where the light shielding layer is located, the at least one first conductive wire is located in the edge region, the light shielding layer comprises at least one first through hole, the at least one first conductive wire has one end electrically coupled to an external circuit, and the other end electrically coupled to the upper conductive layer via the at least one first through hole.

* * * * *